United States Patent
Lerner et al.

(10) Patent No.: US 11,090,986 B1
(45) Date of Patent: Aug. 17, 2021

(54) VEHICLE TIRE PRESSURE LEARNING SYSTEM AND METHOD

(71) Applicant: Toyota Motor Engineering And Manufacturing North America, Inc., Plano, TX (US)

(72) Inventors: Emily S Lerner, Brighton, MI (US); Ryan M Wiesenberg, Ann Arbor, MI (US); Kristofer Kusano, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/842,275

(22) Filed: Apr. 7, 2020

(51) Int. Cl.
*B60C 23/04* (2006.01)
*G01L 17/00* (2006.01)
*G06N 20/00* (2019.01)

(52) U.S. Cl.
CPC .......... *B60C 23/0447* (2013.01); *G01L 17/00* (2013.01); *G06N 20/00* (2019.01)

(58) Field of Classification Search
CPC ...... B60C 23/0447; G01L 17/00; G06N 20/00
USPC ....... 340/939, 425.5, 438, 442, 449, 539.26, 340/539.27, 539.28, 601, 602
See application file for complete search history.

(56) References Cited

U.S. PATENT DOCUMENTS

| | | | |
|---|---|---|---|
| 7,165,460 B2 * | 1/2007 | Silverbrook | G01L 9/0072 73/729.2 |
| 8,989,920 B2 * | 3/2015 | Breed | G08G 1/096783 701/2 |
| 9,296,263 B2 | 3/2016 | Muthukumar | |
| 9,522,577 B2 | 12/2016 | Dilisio et al. | |
| 2003/0121319 A1 * | 7/2003 | Kojima | B60C 23/061 73/146.2 |
| 2015/0005982 A1 * | 1/2015 | Muthukumar | G01P 15/00 701/1 |
| 2018/0001890 A1 * | 1/2018 | Ratcliffe | G08G 1/16 |
| 2018/0350366 A1 * | 12/2018 | Park | G10L 15/30 |

FOREIGN PATENT DOCUMENTS

| | | | |
|---|---|---|---|
| CN | 209274286 U | * | 8/2019 |
| WO | 2016100563 A1 | | 6/2016 |

OTHER PUBLICATIONS

New PlantSmart Module for TyreWatch; Feb. 20, 2019; 2 pages.

* cited by examiner

*Primary Examiner* — Daryl C Pope
(74) *Attorney, Agent, or Firm* — Jordan IP Law, LLC

(57) ABSTRACT

Methods and systems may provide for technology to collect data related to tire pressure of a vehicle via one or more tire pressure monitoring sensors (TPMS), and provide a warning for a low or high tire pressure based on weather patterns determined by a historic weather data subsystem. The weather patterns may include fluctuations and steady states of temperature. A TPMS machine learning subsystem may use tire pressure data and weather data to provide an alert as to whether an indicator associated with the one or more TPMS sensors was activated due to changing weather. The TPMS machine learning subsystem may also determine a probable accuracy of the TPMS alert based on the TPMS data and weather-related data including checking for outliners in the weather patterns.

17 Claims, 4 Drawing Sheets

VEHICLE TIRE PRESSURE LEARNING SYSTEM AND METHOD

TECHNICAL FIELD

Embodiments generally relate to vehicle tire pressure sensors. More particularly, embodiments relate to more accurately predicting and determining a cause of changes in vehicle tire pressures.

BACKGROUND

Tires are critically important components of a vehicle. Properly inflated and maintained tires help to provide a safe and enjoyable driving experience for vehicle users. Proper inflation (e.g., inflation within a range of pressures prescribed by the tire manufacturer) helps tires maintain an intended performance profile including, for example, tread-surface contact, traction, sidewall rigidity, responsiveness, load capacity, and the like. Conversely, under-inflated or over-inflated tires may present serious safety hazards. Under-inflation, for example, may cause the tires to be more easily damaged (e.g., punctured) as the thin side walls of the tires (which are not intended to contact the road or ground surface) may come into contact with the road surface or debris. Similarly, over-inflation may cause the tires to become too rigid and unforgiving, and increase the likelihood of puncture. Under-inflation and over-inflation may also substantially impact the drivability, performance and wear of tires. Air temperatures directly impact tire inflation (i.e., tire pressure). As air temperature rises, tire pressure rises. As air temperature drops, tire pressure drops. Significant changes in air temperature may therefore present a challenge to maintaining stable tire pressure. Due to the impact of tire inflation on vehicle safety, performance, and drivability, maintaining proper tire inflation is critically important.

BRIEF SUMMARY

In one embodiment, a vehicle tire pressure learning system including a processor, memory communicatively coupled to the processor, and one or more tire pressure monitoring sensors (TPMS), in communication with the processor, to collect data related to a pressure of one or more tires of a vehicle, and provide a warning for a low or high tire pressure. The system may also include a historic weather data subsystem, in communication with the one or more tire pressure monitoring sensors, to determine weather patterns, wherein the weather patterns include fluctuations and steady states of temperature. The historic weather data subsystem may provide, when the weather is determined to be fluctuating, an alert that an indicator associated with the one or more tire pressure monitoring sensors may have been activated due to changing weather, and provide, when the weather is determined to be substantially steady, an alert that an indicator associated with the one or more TPMS may not have been activated due to weather. The system may further include a TPMS machine learning subsystem in communication with the one or more tire pressure monitor sensors and the historic weather data subsystem, wherein the TPMS machine learning subsystem includes a processor and memory having a set of instructions, which when executed by the processor, cause the TPMS machine learning subsystem to determine a probable accuracy of the TPMS alert based on the historic TPMS data including checking for outliners in the weather patterns.

In another embodiment, a method of operating a vehicle tire pressure learning system including collecting, via one or more tire pressure monitoring sensors (TPMS), data related to a pressure of one or more tires of a vehicle, providing a warning for a low or high tire pressure, and determining, via a historic weather data subsystem, weather patterns, wherein the weather patterns include fluctuations and steady states of temperature. The method may include providing, when the weather is determined to be fluctuating, an alert that an indicator associated with the one or more TPMS may have been activated due to changing weather, and providing, when the weather is determined to be substantially steady, an alert that an indicator associated with the one or more TPMS may not have been activated due to weather. The method may further include checking historic TPMS data to determine a probable accuracy of the TPMS alert based on the historic TPMS data including checking for outliners in the weather patterns.

In yet another embodiment, at least one computer readable storage medium comprising a set of instructions, when executed by a processor, cause the processor to collect, via one or more tire pressure monitoring sensors (TPMS), data related to a pressure of one or more tires of a vehicle, provide a warning for a low or high tire pressure, and determine, via a historic weather data subsystem, weather patterns, wherein the weather patterns include fluctuations and steady states of temperature. The computer readable storage medium, when executed by the processor may also cause the processor to provide, when the weather is determined to be fluctuating, an alert that an indicator associated with the one or more TPMS may have been activated due to changing weather, and provide, when the weather is determined to be substantially steady, an alert that an indicator associated with the one or more TPMS may not have been activated due to weather. The computer readable storage medium, when executed by the processor may also cause the processor to determine a probable accuracy of the TPMS alert based on the historic TPMS data including checking for outliners in the weather patterns.

BRIEF DESCRIPTION OF THE SEVERAL VIEWS OF THE DRAWINGS

The various advantages of the embodiments will become apparent to one skilled in the art by reading the following specification and appended claims, and by referencing the following drawings, in which:

DETAILED DESCRIPTION

Figure 1:
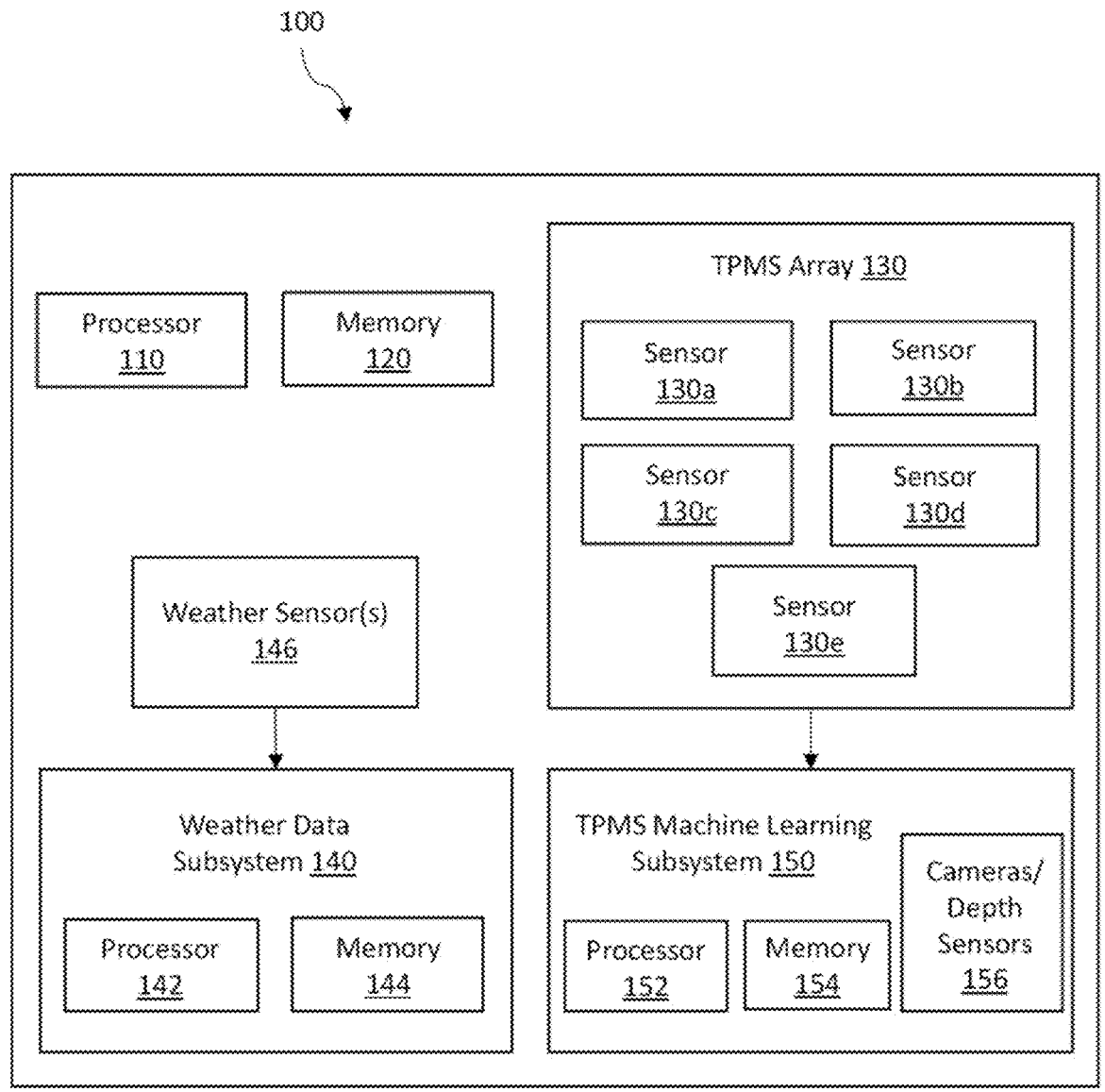
FIG. 1 is a block diagram of an example of a vehicle tire pressure learning system according to an embodiment.

Turning now to FIG. 1, an example of a vehicle tire pressure learning system 100 is shown. The system 100 may be implemented in a vehicle (e.g., car, truck, van, sport utility vehicle/SUV, taxi, shuttle, aircraft, etc.) (not shown here) to dynamically monitor and accurately validate changes in the pressure of individual tires of the vehicle. In some embodiments, the system 100 may monitor the tire(s) and other factors (e.g., ambient temperature, internal tire temperature, tire pressure, altitude, etc.) that directly or indirectly impact tire performance.

System 100 may include a processor 110, memory 120, a tire pressure monitoring sensors (TPMS) array monitor 130, a weather data subsystem 140, and a TPMS machine learning subsystem 150. The processor 110 and memory 120 may be in communication with the TPMS array monitor 130, the weather data subsystem 140 and the TPMS machine learning subsystem 150. The TPMS array monitor 130 may include one or more sensors, e.g., sensor 130*a*, sensor 130*b*, 130*c*, 130*d*, and 130*e*, to measure and collect data related to individual vehicle tires (not shown here). The collected data includes tire pressure (i.e., an air pressure inside a pneumatic tire), and may also include other variables that affect tire pressure including, for example, internal tire temperature (i.e., temperature within the bladder of the tire), tire speed (i.e., rotational speed), torque, tire load, ambient temperature, road conditions, altitude, etc. The foregoing examples of variables have been provided for discussion purposes and the disclosure is not intended to be limited to these example. As a result, embodiments may encompass additional variables that fall within the spirit and scope of the principles of the disclosure set forth herein.

The TPMS array monitor 130 may also provide a warning to a driver for a low pressure or a high pressure. The warning may be based on, for example, a detected pressure being outside of a recommended pressure range. The warning by be provided via a visual, haptic, and/or audible alert (e.g., a graph, gauge, light, dial or other indicator on a display or monitor, or a speaking alert, chirp, beep, and the like). The individual sensors of the TMPS array monitor 130 may comprise a variety of sensor types, including but not limited to, for example, direct (i.e., valve stem type) sensors that directly measure an internal pressure of the tire, or indirect sensors that do not directly measure internal pressures but monitor wheel rotational speed and other signals outside of the tire to determine internal tire pressures.

As an example, tire manufacturers may provide a recommendation that a tire be inflated to a range of 35 pounds per square inch to 51 pounds per square include (35 psi-51 psi). If the detected pressure is determined to be below 35 psi, a low pressure or under-inflation warning will be issued. Similarly, if the detected pressure is determined to be above 51 psi, a high pressure or over-inflation warning will be issued. The TPMS array monitor 130 may be set or programmed with these pressures to trigger an alert. These pressures and pressure range are provided solely as examples, and other pressures and pressure ranges may be used based on knowledge within known to a person of ordinary skill in the art. Further, while standard pressures and pressure ranges recommended by the tire manufacturer are envisioned, other pressures and pressure ranges outside of those recommended by the manufacturer may also be used based on knowledge known to a person of ordinary skill in the art.

The weather data subsystem 140 may include a processor 142 and memory or a database 144. The weather data subsystem 140 may receive an input from one or more weather sensors 146 to collect weather-related data, e.g., ambient air temperature and pressure, as well as data collected from the TPMS array monitor 130. The weather data subsystem 140 may store and correlate the collected weather data with data received from the TPMS array monitor 130. The database 144 may store and correlate the collected data in a variety of schemes to provide context for the collected data including, for example, correlating the tire pressure data with the date, time of day, ambient air temperature, and other weather-related conditions that may affect tire pressure. The TPMS machine learning subsystem 150 may include a processor 152 and memory 154, and is in communication with the TPMS array monitor 130, and weather data subsystem 140.

The TPMS machine learning subsystem 150 uses the data received from the TPMS array monitor 130 and weather data subsystem 140 to determine a probable accuracy of a tire pressure alert. The TPMS machine learning subsystem 150 may also check for outliers in the weather patterns to determine the accuracy of the TPMS alert. Outliers may include, for example, an unexpected and/or substantial deviation in a daily air temperature (e.g., average high or low temperature, average temperature swing, and the like) that would tend to suggest that the temperature is likely to return to the expected temperature.

The TPMS machine learning subsystem 150 may determine a relationship between tire pressure and air temperature. The tire pressure may, for example, have a direct relationship with air temperature. The TPMS machine learning subsystem 150 may determine based on information received from the weather data subsystem 140, for example, that a relationship between temperature (e.g., degrees Fahrenheit) and tire pressure (e.g., psi) of ten-to-one (10:1) (i.e., 10° F.-to-1 psi). As a result, a ten (10) degree Fahrenheit decrease (−10° F.) in temperature would likely result in a change in tire pressure of −1 psi, a twenty (20) degree Fahrenheit decrease (−20° F.) in temperature would likely result in a change in tire pressure of −2 psi, a thirty (30) degree Fahrenheit decrease (−30° F.) in temperature would likely result in a decrease in tire pressure of 3 psi, a forty (40) degree Fahrenheit decrease (−40° F.) in temperature would likely result in a change in tire pressure of −4 psi, and so forth. Based on this correlation, when the tire pressure is at 36 psi, a thirty (30) degree Fahrenheit decrease (−30° F.) in temperature would likely cause a decrease in tire pressure of −3 psi which would result in a tire pressure of 33 psi (i.e., 36 psi-3 psi=33 psi). If the tires have a recommended pressure inflation range of 35 psi to 51 psi, the decrease in tire pressure to 33 psi would cause a low pressure alert to be issued by the TPMS array monitor 130. The TPMS machine learning subsystem 150 would determine based on the weather data (i.e., a 30° F. decrease in air temperature) provided by the weather data subsystem 140, that the corresponding 3 psi decrease in tire pressure (i.e., a current tire pressure of 33 psi) is accurate. As a result, the TPMS alert would be determined to be accurate.

In at least some embodiments, the weather data subsystem 140 may also provide, when the weather is determined to be fluctuating, an alert that an indicator associated with the one or more TPMS may have been activated due to changing weather. Such an alert may signify that the pressure change in the tire is due to weather changes, and not due to damage to the tire or another hazardous condition. Some examples of alerts due to changing weather may include temperature swings when the seasons are changing, temperature changes during severe weather events, temperature and pressure changes due to changes in elevation, etc. The weather data subsystem 140 may also provide, when the weather is determined to be substantially steady, an alert that an indicator associated with the one or more TPMS may not have been activated due to weather. Such an alert may signify that the pressure change in the tire is due to damage (e.g., a puncture or poor seal) or another hazardous condition (e.g., hard braking, burnouts, high g-forces, etc.). The weather data subsystem 140 may use this information to better determine the accuracy and/or cause of a TPMS alert.

In at least some embodiments, when determining the accuracy and/or cause of a TPMS alert, the TPMS machine learning subsystem 150 may also determine a probability that a tire hit a pothole or other road hazard within a defined period of time. The period of time may correspond with an event such as an increase in a torque or pressure at a tire consistent with an encounter with a pothole including, for example, a spike in tire pressure, a swerve or sharp turn of the vehicle, and other similar events. The torque data and/or pressure data may be measured by sensors 130a-130e and saved to memory 154 of the TPMS machine learning subsystem 150. One or more cameras and/or depth sensors 156 may also provide an input to the TMPS machine learning subsystem 150 related to road data such as potholes or other road hazards. The cameras or depth sensors 156 may utilize various detection principles including, for example, video, lidar, sonar, radar, and the like to detect potholes, debris and other hazards in the road. The cameras 156 may be positioned on the exterior of the vehicle (e.g., in a front bumper, grille, lower fascia, etc.) to detect road data such as potholes or other road hazards (e.g., debris, obstructions, and the like) and save the road data to memory 154. The cameras 156 may use one of various machine learning-based object detection approaches to identify the road data including a type (i.e., class) of a hazard or object.

Upon the detection of a pothole or other road hazard by the cameras 156, the TPMS machine learning subsystem 150 may tag and save the detected road data to memory 154 including a hazard type (e.g., pothole, debris, sharp object, etc.) and a location (e.g., from a GPS unit of the vehicle or a connected smart device). The tags may also optionally include a picture and a degree or severity of the hazard. Upon a change (i.e., increase or decrease) in tire torque or pressure, the TPMS machine learning subsystem 150 may correlate the tire torque or pressure with the saved road data to determine a probability that a tire hit a pothole or other road hazard (as detected by the cameras) within a defined period of time and/or location. The time and/or location may, for example, correspond with the location of a detected pothole or other road hazard.

The TPMS machine learning subsystem 150 may indicate that an increase in tire torque or pressure correlates with a pothole, obstruction, or other road hazard that has likely been hit by the tire causing a sudden increase in torque or pressure. On the other hand, a decrease in tire pressure may indicate, for example, that the tire has been punctured—possibly by a pothole, obstruction, or other road hazard. In some instances, contact by a tire with a pothole, obstruction, or other road hazard may lead to an increase in tire torque or pressure, followed by a decrease in pressure. Such a scenario would tend to indicate that a tire has been punctured.

The TPMS machine learning subsystem 150 may store detected road information and use the road information to profile the tire torque and pressure characteristics over time in order to better identify road hazards and the associated risks presented by the hazards. As an example, the TPMS machine learning subsystem 150 may correlate a detected increase or spike in tire torque or pressure with a pothole detected by cameras 156. The TPMS machine learning subsystem 150 may also communicate with TPMS machine learning systems of one or more other vehicles to share (i.e., transmit/receive) road information with (i.e., to/from) the other vehicles. As a result, the TPMS machine learning subsystem 150 may also correlate a detected increase or spike in tire torque or pressure with road information that has been identified and shared by a TPMS machine learning system of another vehicle.

In at least some embodiments, the TPMS machine learning subsystem 150 may also determine a cause and severity of a changing tire pressure. As an example, the TPMS machine learning subsystem 150 may determine that a changing tire pressure is due to a detected pothole that corresponds with the location of the vehicle and a change in the torque and/or pressure of a tire.

The TPMS machine learning subsystem 150 may also determine a cause and severity of a changing tire pressure. For example, a profile of the hazard and a degree (i.e., rate) of the change in torque or pressure may be used to determine the cause and severity. This information may also be used to determine or predict a further tire incident including, for example, a slow leak that will likely lead to a flat over an extended period of time, a moderate leak that will likely lead to a flat in a short period of time, a puncture that will likely lead to an immediate failure of the tire, running over debris that will likely cause a flat, and the like.

Figure 2:
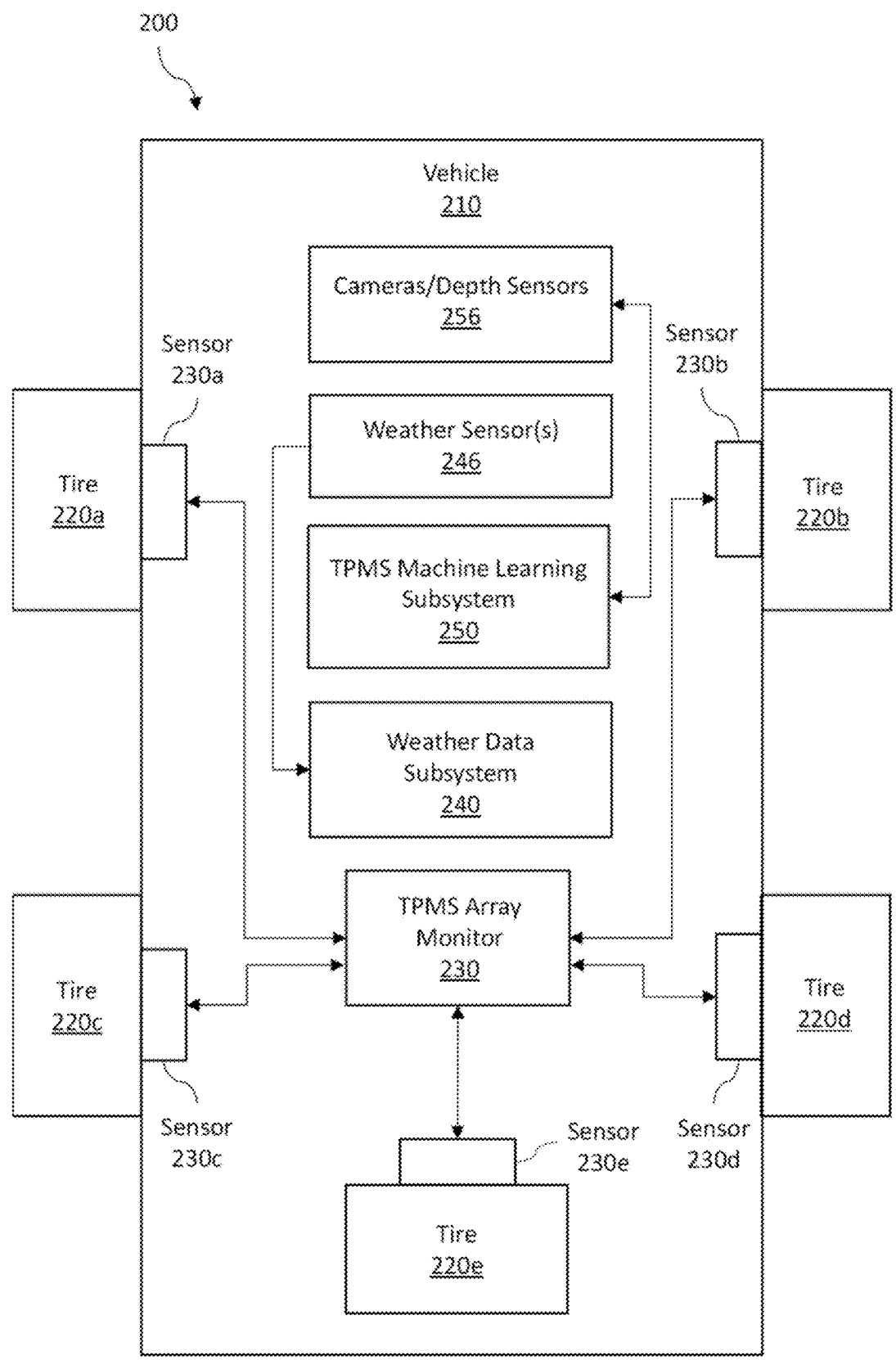
FIG. 2 is a more detailed block diagram of an example of a vehicle tire pressure learning system implemented in a vehicle according to an embodiment.

FIG. 2 illustrates a more detailed block diagram of an example of a vehicle tire pressure learning system 200. The system 200 may be implemented in a vehicle 210. The vehicle 210 may include one or more tires 220a-220e, and the vehicle tire pressure learning system may include a TPMS array monitor 230 in communication with sensors 230a-230e, a weather data subsystem 240, and a TPMS machine learning subsystem 250. The tires 220a, 220b, 220c, 220d, and 220e, may correspond to, for example, a front driver-side tire 220a, a front passenger-side tire 220b, a rear driver-side tire 220c, a rear passenger-side tire 220d, and an optional spare tire 220e. Each tire 220a-220e is mounted on a wheel or hub assembly (not shown) having a sensor 230a-230e such as sensors 130a-130e as discussed above with respect to FIG. 1.

The TPMS array monitor 230 receives inputs from sensors 230a-230e that measure and collect data related to a pressure of a tire associated with the one from one or more sensors 230a-230e. The collected data may include tire pressure, internal tire temperature, tire rotational speed, torque, and other data that may affect tire pressure. The TPMS array monitor 230 may also provide a warning to a driver for a low pressure or a high pressure. The weather data subsystem 240 is in communication with sensors 230a-230e via the TPMS array monitor 230 to determine weather patterns based at least in part on information received from the sensors 230a-230e. The weather patterns may be determined based at least in part on input received from one or more weather sensors 246 that collect weather-related data, e.g., ambient air temperature, pressure, and the like. The weather data subsystem 240 may also receive and store data collected by the TPMS array monitor 230 in a database (not shown here).

The TPMS machine learning subsystem 250 may receive information from the weather data subsystem TPMS array monitor 230 and the weather data subsystem 240 to determine a probable accuracy of a TPMS alert (e.g., an under-inflation or over-inflation alert) based on the TPMS data. When determining the probable accuracy, the TPMS machine learning subsystem 250 may also check for outliers in the weather patterns.

The TPMS machine learning subsystem 250 may correlate and refine the collected weather data with the collected tire pressure data to provide context for the collected data including, for example, correlating the tire pressure data on various parameters that might affect tire pressure such as the date, time of day, ambient air temperature, weather patterns (e.g., temperature fluctuations, steady states, etc.), and other weather-related conditions. The correlated data may allow the system to more easily identify patterns and dependencies (i.e., temperature-pressure) in the data. The correlated data may also allow the system to identify outliers in the data.

The TPMS machine learning subsystem 250 may also receive input from cameras or depth sensors 256 related to road data such as potholes or other road hazards, and determine a probability that a tire hit a pothole or other road hazard within a defined period of time by checking saved road and torque data.

The TPMS machine learning subsystem 250 may also share information with one or more machine learning systems associated with one or more other vehicles. The TPMS machine learning subsystem 250 may thereby more accurately determine whether an indicator associated with one or more TPMS was activated due to changing weather, and to determine a cause and severity of a changing tire pressure. The TPMS machine learning subsystem 250 may also predict a further tire incident such as under-inflation, over-inflation, or damage.

Figure 3:
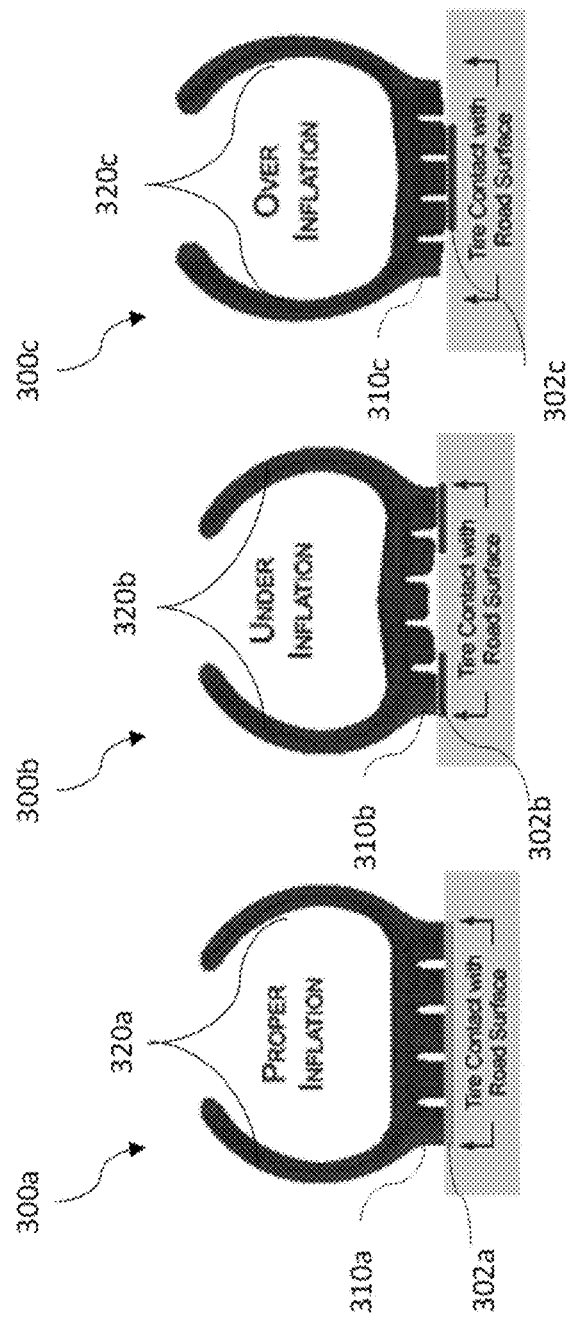
FIGS. 3A-3C illustrate examples of vehicle tire tread and road surface contact patterns according to at least one embodiment.

FIGS. 3A-3C illustrate examples of typical vehicle tire tread and road surface contact patterns according to at least one embodiment.

FIG. 3A illustrates a partial cross-section of a profile of a properly inflated tire 300a. Properly inflated tires, such as tire 300a, maintain a proper rigidity of the tire sidewalls 320a, and maintain more even contact across the tire treads 310a and the road surface 302a. The even contact provides more consistent control of traction, acceleration, steering and braking than improperly inflated tires. The treads 310a of properly inflated tires also wear more evenly which may extend the life and safety of the tires 310a, and lead to improved fuel efficiency.

FIG. 3B illustrates a partial cross-section of a profile of an under-inflated tire 300b. Under-inflated tires, such as tire 300b, tend to not maintain the proper rigidity of the tire sidewall 320b. As a result, the under-inflated tires tend to contact the road surface 302b more at each perimeter/edge of the tire 302b and along the sidewall 320b, and make less contact in the center/middle of the tire 302b. Due to the tread-surface contact pattern, the treads 310b under-inflated tires 300b tend to wear unevenly which leads to shortened life and decreased safety. Under-inflated tires, e.g., tire 300b, tend to provide poorer control of traction, acceleration, steering and braking than properly inflated tires, e.g., tire 300a.

FIG. 3C illustrates a partial cross-section of a profile of an over-inflated tire 300c. Over-inflated tires, such as tire 300c, tend to have sidewall 320c that are too rigid. The tire 300c also tends to contact the road surface 302c primarily at the center/middle of the tire, and have less contact on the perimeter/edge of the tire. As a result, over-inflated tires also tend to wear unevenly thereby leading to shortened life, and provide considerably poorer control of traction, acceleration, steering and braking than properly inflated tires, e.g., tire 300a. As illustrated by these example, avoiding improperly inflated tires, and maintaining proper tire inflation provides significant benefits related to safety, performance, efficiency and wear.

Figure 4:
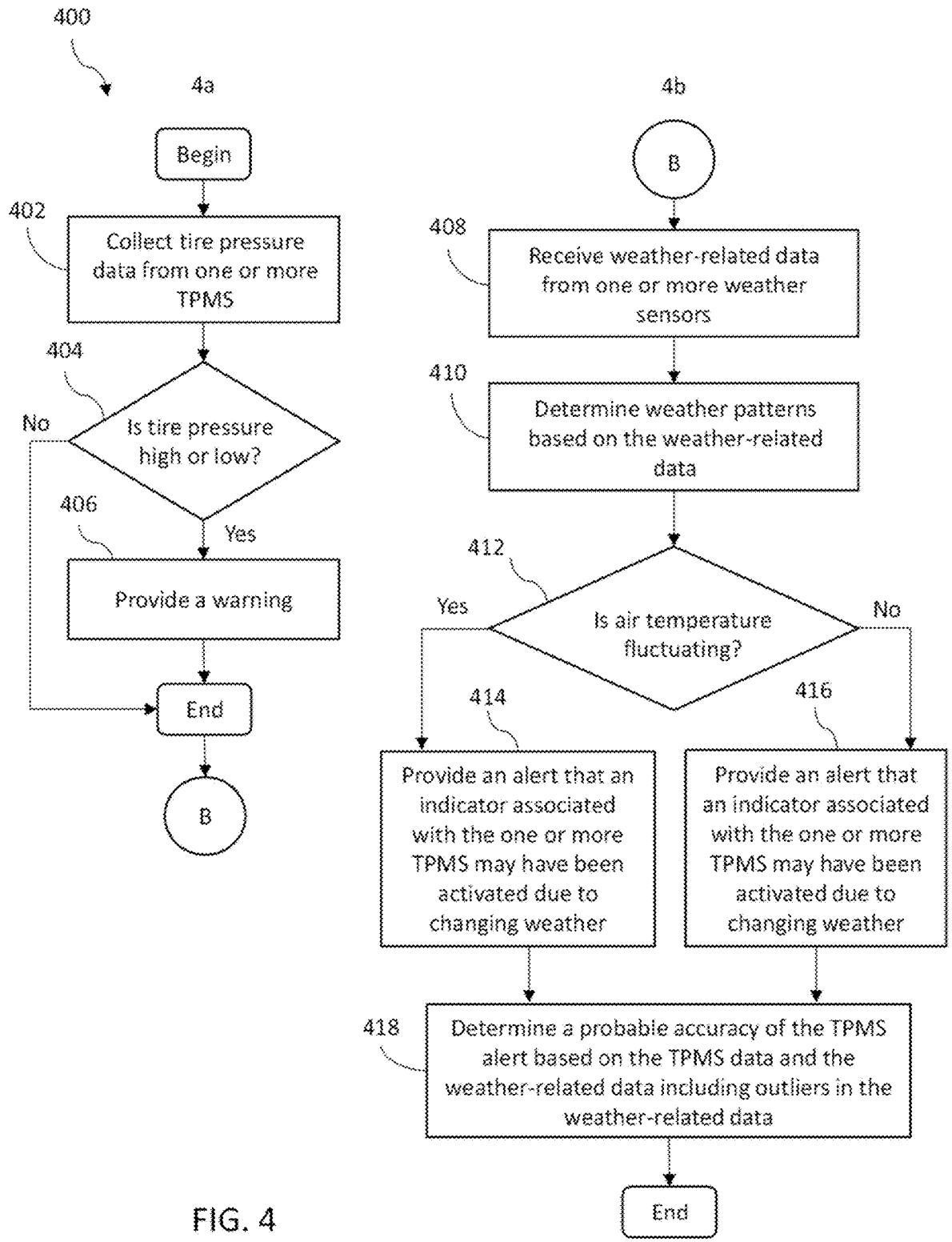
FIG. 4 is a flowchart of an example of a method of operating vehicle tire pressure learning system according to an embodiment.

FIG. 4 is a flowchart of an example of a method of operating vehicle tire pressure learning system according to an embodiment. The method 400 may be implemented in logic instructions (e.g., software), configurable logic, fixed-functionality hardware logic, etc., or any combination thereof.

Illustrated processing block 402 collects tire pressure data from one or more tire pressure monitoring sensors (TPMS) associated with one or more vehicle tires. The TPMS may be, for example, sensors 130a-130e of sensor array 130, or sensor 230a-230e, as discussed above with respect to FIGS. 1 and 2, respectively.

Block 404 determines based on the collected tire pressure data whether a tire pressure associated with the one or more TPMS is high or low. If "Yes" at block 404, block 406 provides a warning to a driver or user of the high or low tire pressure, and this portion of the process ends. The alert may be in any form including, for example, audible, visual, graphical, and the like. If "No" at block 404, this portion of the process ends.

At block 408, weather-related data is received from one or more weather sensors and/or TPMS. The weather-related data may include, for example, ambient air temperature and pressure as collected by one or more sensors such as weather sensors 146, as well as data collected from the TPMS 130a-130e.

Block 410 determines weather patterns based on the weather-related data.

Block 412 determine whether the measured air temperature is fluctuating. If "Yes" at block 412, block 414 provides an alert that the air temperature has been determined to be substantially fluctuating and an indicator associated with the one or more TPMS may have been activated due to changing weather.

If "No" at block 412, block 416 provides an alert that the air temperature has been determined to be substantially steady and that an indicator associated with the one or more TPMS may not have been activated due to weather.

Block 418 determines a probable accuracy of the TPMS alert based on the TPMS data and the weather-related data including outliers in the weather-related data. The possible accuracy of the alert may be determined, for example, by a TPMS machine learning subsystem 150 by correlating the tire pressure data and the weather-related data including outliers in the weather-related data, as discussed above with respect to FIG. 1.

The term and phrase "communication" and "in communication", respectively, may be used herein to refer to any type of relationship, direct or indirect, between the systems, subsystems, and components in question, and may apply to electrical, mechanical, fluid, optical, electromagnetic, electromechanical or other connections. In addition, the terms "system" and "subsystem" may be used interchangeably herein and may not be rigidly defined schematically unless otherwise indicated.

Those skilled in the art will appreciate from the foregoing description that the broad techniques of the embodiments of the instant disclosure can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A vehicle tire pressure learning system comprising:
a processor;
one or more tire pressure monitoring sensors (TPMS), in communication with the processor, to:
collect data related to a pressure of one or more tires of a vehicle, and provide a TPMS alert for a low or high tire pressure;
a weather data subsystem, in communication with the one or more TPMS, to determine weather patterns based on weather-related data received from one or more weather sensors, wherein the weather patterns include fluctuations and steady states of temperature; and
a TPMS machine learning subsystem in communication with the one or more TPMS and the weather data subsystem, wherein the TPMS machine learning subsystem includes a processor and memory having a set of instructions, which when executed by the processor, cause the TPMS machine learning subsystem to determine a probable accuracy of the TPMS alert based on the TPMS data and the weather-related data,
wherein the TPMS machine learning subsystem is to predict when running over debris will cause a flat.

2. A vehicle tire pressure learning system comprising:
a processor;
one or more tire pressure monitoring sensors (TPMS), in communication with the processor, to:
collect data related to a pressure of one or more tires of a vehicle, and
provide a TPMS alert for a low or high tire pressure;
a weather data subsystem, in communication with the one or more TPMS, to determine weather patterns based on weather-related data received from one or more weather sensors, wherein the weather patterns include fluctuations and steady states of temperature; and
a TPMS machine learning subsystem in communication with the one or more TPMS and the weather data subsystem, wherein the TPMS machine learning subsystem includes a processor and memory having a set of instructions, which when executed by the processor, cause the TPMS machine learning subsystem to determine a probable accuracy of the TPMS alert based on the TPMS data and the weather-related data,
wherein the weather data subsystem is further to:
provide, when the weather is determined to be substantially fluctuating, an alert that an indicator associated with the one or more TPMS may have been activated due to changing weather, and
provide, when the weather is determined to be substantially steady, an alert that an indicator associated with the one or more TPMS may not have been activated due to weather.

3. The system of claim 1, further comprising one or more cameras to provide an input to the TPMS machine learning subsystem related to road data, wherein the road data includes information related to a pothole or other road hazard.

4. The system of claim 3, wherein the TPMS machine learning subsystem is further to determine a probability that a tire hit a pothole or other road hazard within a defined period of time, wherein determining the probability includes checking saved road and torque data.

5. The system of claim 3, wherein the TPMS machine learning subsystem is further to determine a cause and a severity of a changing tire pressure.

6. The system of claim 3, wherein the TPMS machine learning subsystem is to share information with one or more other machine learning systems associated with one or more other vehicles.

7. A method of operating a vehicle tire pressure learning system comprising:
collecting, via one or more tire pressure monitoring sensors (TPMS), data related to a pressure of one or more tires of a vehicle;
providing a TPMS alert for a low or high tire pressure;
determining, via a weather data subsystem, weather patterns based on weather-related data received from one or more weather sensors, wherein the weather patterns include fluctuations and steady states of temperature;
determining, via a TPMS machine learning subsystem, a probable accuracy of the TPMS alert based on the TPMS data and the weather-related data; and
predicting, via the TPMS machine learning subsystem, when running over debris will cause a flat.

8. A method of operating a vehicle tire pressure learning system comprising:
collecting, via one or more tire pressure monitoring sensors (TPMS), data related to a pressure of one or more tires of a vehicle;
providing a TPMS alert for a low or high tire pressure;
determining, via a weather data subsystem, weather patterns based on weather-related data received from one or more weather sensors, wherein the weather patterns include fluctuations and steady states of temperature;
determining, via a TPMS machine learning subsystem, a probable accuracy of the TPMS alert based on the TPMS data and the weather-related data;
providing, when the weather is determined to be substantially fluctuating, an alert that an indicator associated with the one or more TPMS may have been activated due to changing weather, and
providing, when the weather is determined to be substantially steady, an alert that an indicator associated with the one or more TPMS may not have been activated due to weather.

9. The method of claim 7, further including providing, via one or more cameras, an input related to road data, wherein the road data includes information related to a pothole or other road hazard.

10. The method of claim 9, further including determining a probability that a tire hit a pothole or other road hazard within a defined period of time, wherein determining the probability includes checking saved road data and torque data.

11. The method of claim 9, further including determining a cause and a severity of a changing tire pressure.

12. The method of claim 7, wherein the TPMS machine learning subsystem is to share information with one or more other machine learning systems associated with one or more other vehicles.

13. At least one non-transitory computer readable storage medium comprising a set of instructions, when executed by a processor, cause the processor to:
collect, via one or more tire pressure monitoring sensors (TPMS), data related to a pressure of one or more tires of a vehicle;
provide a TPMS alert for a low or high tire pressure;
determine, via a weather data subsystem, weather patterns based on weather-related data received from one or more weather sensors, wherein the weather patterns include fluctuations and steady states of temperature;
determine, via a TPMS machine learning subsystem, a probable accuracy of the TPMS alert based on the TPMS data and the weather-related data; and
predict, via the TPMS machine learning subsystem, when running over debris will cause a flat.

14. At least one non-transitory computer readable storage medium comprising a set of instructions, when executed by a processor, cause the processor to:

collect, via one or more tire pressure monitoring sensors (TPMS), data related to a pressure of one or more tires of a vehicle;

provide a TPMS alert for a low or high tire pressure;

determine, via a weather data subsystem, weather patterns based on weather-related data received from one or more weather sensors, wherein the weather patterns include fluctuations and steady states of temperature; and determine, via a TPMS machine learning subsystem, a probable accuracy of the TPMS alert based on the TPMS data and the weather-related data, wherein the instructions, when executed, further cause the processor to:

provide, when the weather is determined to be substantially fluctuating, an alert that an indicator associated with the one or more TPMS may have been activated due to changing weather, and provide, when the weather is determined to be substantially steady, an alert that an indicator associated with the one or more TPMS may not have been activated due to weather.

15. The at least one non-transitory computer readable storage medium of claim 13, wherein the instructions, when executed, further cause the processor to determine a probability that a tire hit a pothole or other road hazard within a defined period of time, wherein determining the probability includes checking saved road data and torque data.

16. The at least one non-transitory computer readable storage medium of claim 13, wherein the instructions, when executed, further cause the processor to determine a cause and a severity of a changing tire pressure.

17. The at least one non-transitory computer readable storage medium of claim 13, wherein the instructions, when executed, further cause the processor to share information with one or more other machine learning systems associated with one or more other vehicles.

* * * * *